United States Patent
Kuranuki et al.

(10) Patent No.: US 7,714,531 B2
(45) Date of Patent: May 11, 2010

(54) POWER SYSTEM AND MANAGEMENT METHOD THEREOF

(75) Inventors: Masaaki Kuranuki, Kyoto (JP); Yuu Inatomi, Osaka (JP)

(73) Assignee: Panasonic Corporation, Osaka (JP)

( * ) Notice: Subject to any disclaimer, the term of this patent is extended or adjusted under 35 U.S.C. 154(b) by 386 days.

(21) Appl. No.: 10/593,281

(22) PCT Filed: Mar. 14, 2005

(86) PCT No.: PCT/JP2005/004442

§ 371 (c)(1),
(2), (4) Date: Sep. 18, 2006

(87) PCT Pub. No.: WO2005/091424

PCT Pub. Date: Sep. 29, 2005

(65) Prior Publication Data

US 2007/0202370 A1    Aug. 30, 2007

(30) Foreign Application Priority Data

Mar. 18, 2004    (JP) .............................. 2004-078891

(51) Int. Cl.
*H02J 7/00*     (2006.01)
*H02J 7/04*     (2006.01)
*H01M 10/44*   (2006.01)

(52) U.S. Cl. ................... 320/101; 320/132; 320/161

(58) Field of Classification Search .............. 320/101, 320/103, 130, 132, 134–136, 149, 150, 152, 320/157–158, 162–163; 429/13, 22–24, 429/27–29, 61–62; 307/43–48, 64–68
See application file for complete search history.

(56) References Cited

U.S. PATENT DOCUMENTS

| 5,334,463 | A | * | 8/1994 | Tajima et al. .................. 429/9 |
| 5,516,598 | A | | 5/1996 | Visco et al. |
| 5,691,078 | A | * | 11/1997 | Kozaki et al. ............... 324/428 |
| 6,377,030 | B1 | * | 4/2002 | Asao et al. ................... 320/161 |
| 2002/0062183 | A1 | * | 5/2002 | Yamaguchi et al. ........... 701/22 |
| 2002/0168568 | A1 | | 11/2002 | Yamaki et al. |
| 2002/0195999 | A1 | * | 12/2002 | Kimura et al. .............. 320/134 |
| 2004/0045818 | A1 | * | 3/2004 | Inatomi et al. .............. 204/291 |

FOREIGN PATENT DOCUMENTS

| JP | 1-172382 A | 4/1989 |
| JP | 1-211860 A | 8/1989 |
| JP | 2000-106219 A | 4/2000 |
| JP | 2002-280076 A | 9/2002 |
| JP | 2004-111374 A | 4/2004 |
| WO | WO 96/03778 | 2/1996 |

* cited by examiner

*Primary Examiner*—Edward Tso
*Assistant Examiner*—Ahmed Omar
(74) *Attorney, Agent, or Firm*—McDermott Will & Emery LLP (57) ABSTRACT

A power system including an electrochemical device, a load device, a power generator, and a charge/discharge controller of the electrochemical device. The electrochemical device includes a positive electrode, a negative electrode, and a liquid electrolyte or a solid electrolyte. The charge/discharge curve of the electrochemical device has at least one step, and a given step of the at least one step has an inflection point. A voltage corresponding to the inflection point or a point adjacent to the inflection point is set as a threshold value, and the charge/discharge controller is configured to control charge/discharge of the electrochemical device such that the voltage of the electrochemical device approaches the threshold value.

18 Claims, 3 Drawing Sheets

POWER SYSTEM AND MANAGEMENT METHOD THEREOF

RELATED APPLICATIONS

This application is the U.S. National Phase under 35 U.S.C. 371 of International Application No. PCT/JP2005/004442, filed on Mar. 14, 2005, which in turn claims the benefit of Japanese Application No. 2004-078891, filed on Mar. 18, 2004, the disclosures of which Applications are incorporated by reference herein.

TECHNICAL FIELD

The present invention relates to a power system including an electrochemical device, a load device, and a power generator and to a method for managing the same.

BACKGROUND ART

Recently, it has been investigated to use an electrochemical device and a power generator in combination as the power source for a portable electronic device, such as an information device, a communication device, a visual device, an audio device, or a still picture device, or an electric vehicle. When an electrochemical device and a power generator are used in combination, if the amount of power generated by the power generator is insufficient, power can be supplied from the electrochemical device to a load device, and if the amount of power generated by the power generator is excessive, the excessive power can be charged into the electrochemical device.

However, if the remaining capacity of the electrochemical device is small, when the amount of power generated by the power generator is insufficient, the electrochemical device cannot supply a necessary amount of power to the load device, so that the operation of a portable device or an electric vehicle becomes unstable. Also, if the remaining capacity of the electrochemical device is excessive, when the amount of power generated by the power generator is excessive, all the excessive power cannot be charged into the electrochemical device, so that energy is wasted. Therefore, in a power system including an electrochemical device, a load device, and a power generator, it is desired to constantly monitor the remaining capacity of the electrochemical device, and to keep the remaining capacity of the electrochemical device above a certain level.

Figure 1:
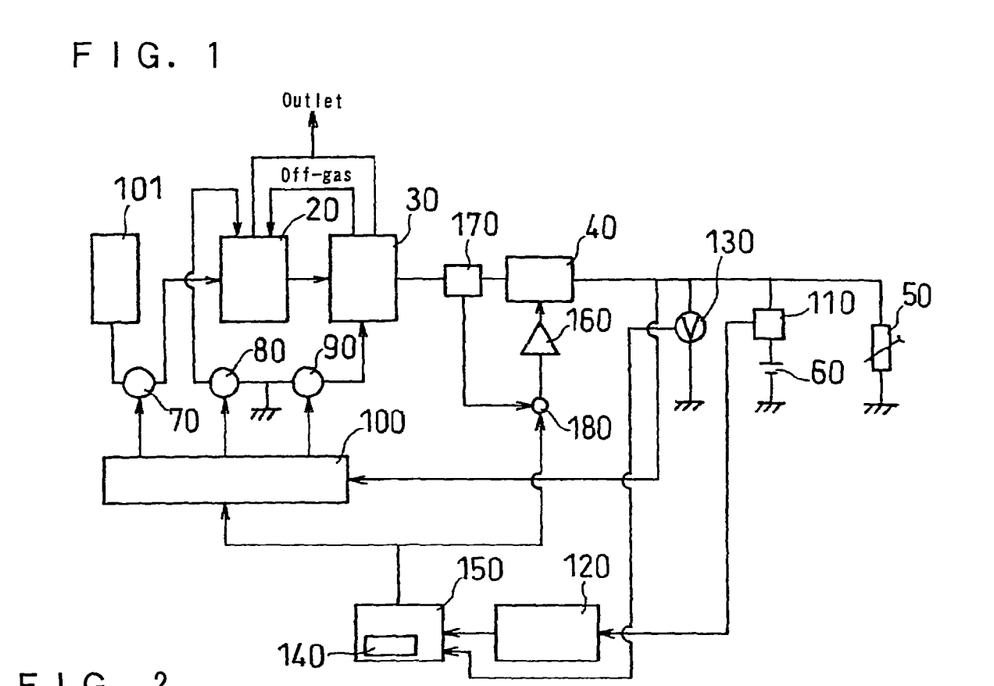
FIG. 1 is a block diagram of a conventional power system.

Referring now to FIG. 1, a description is given of a method for monitoring the remaining capacity of an electrochemical device in a conventionally proposed power system. FIG. 1 is a block diagram of a conventional power system (see Patent Document 1). The system of FIG. 1 has a fuel cell 30 as a power generator that supplies power to a load device 5. This system has a storage battery 60 as a back-up electrochemical device. Fuel produced by a reformer 20 is supplied to the fuel cell. A raw material of fuel is supplied to the reformer 20 from a raw material tank 101.

The output of the fuel cell 30 is produced by controlling various auxiliaries by means of an auxiliary controller 100. That is, the auxiliary controller 100 controls a reaction air blower 90 that supplies air to the cathode of the fuel cell, a combustion air blower 80 that supplies air to the burner of the reformer 20, and a raw material pump 70 that supplies the raw material of fuel from the raw material tank 101 to the reformer. The value of current outputted from the fuel cell is detected by an output current detector 170.

Meanwhile, the storage battery 60 is connected to a current detector 110 and a voltage detector 130. The current detected by the current detector 110 is integrated by an integrator 120. The detected voltage and the integrated current value are sent to a system controller 150. The system controller 150 is equipped with a memory 140, and the memory stores the target value of remaining capacity of the storage battery. The system controller 150 performs a calculation based on the detected voltage value, the integrated current value, the target value of remaining capacity, and the like, and controls the auxiliary controller 100 based on the calculated result. The current value detected by the output current detector 170 and the calculated result produced by the system controller 150 are sent to a data comparator 180, where they are compared with each other. Based on the compared result, a regulator 160, which controls a DC/DC converter 40, is controlled.

The above-described system can control the current supplied from the fuel cell to the storage battery and the load based on the remaining capacity of the storage battery. However, a circuit equipped with the current detector 110 and the integrator 120 is necessary, and the control method becomes complicated. The current detector is composed of a shunt resistor, a hall element or the like and thus costly.

Figure 2:
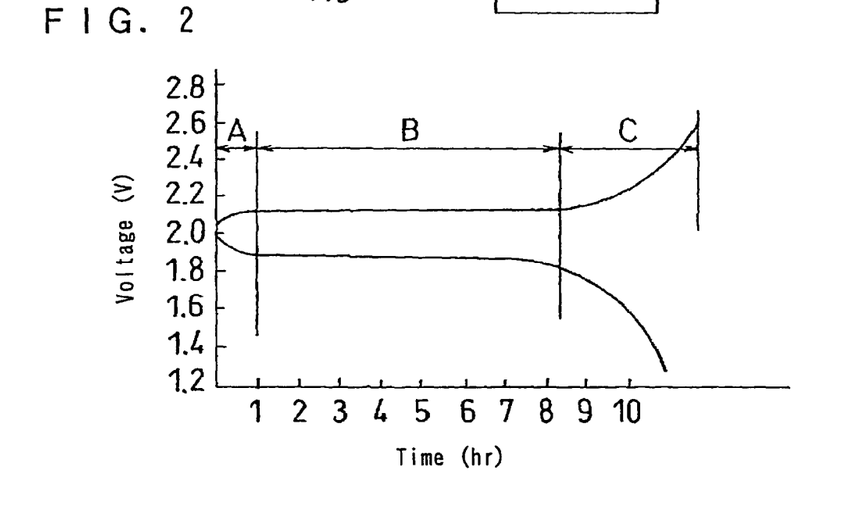
FIG. 2 shows a charge/discharge curve of an electrochemical device included in the conventional power system.

FIG. 2 shows a charge/discharge curve of a common electrochemical device.

As shown in FIG. 2, the charge/discharge curve can be divided into three regions A to C. In the region B, a reversible charge/discharge reaction proceeds in the electrochemical device, but in the region C, there is a tendency of poor reversibility. It is thus preferred to utilize only the flat region B exhibiting stable output in a power system including an electrochemical device, a load device, and a power generator.

However, in the flat region B, the voltage hardly changes, so it is difficult to utilize only the voltage in order to monitor the remaining capacity of the electrochemical device. Also, if conditions such as a current value and ambient temperature are different, different voltage values are detected for the same remaining capacity. Further, even if the voltage of an electrochemical device is estimated by utilizing a parameter such as a current value, this is not useful for estimating the remaining capacity of the electrochemical device in the flat region of the charge/discharge curve. Accordingly, it is necessary to employ a method of integrating current values with respect to time (hereinafter referred to as current integration) to monitor the remaining capacity.

Also, when the B region is not completely flat and its inclination is gentle, utilizing only the voltage for monitoring the remaining capacity of an electrochemical device requires a high level of voltage detection accuracy. It also requires accuracy in detecting a parameter necessary for correction. However, trying to achieve such accuracy results in high costs. On the other hand, if the accuracy is poor, it is not possible to correctly monitor the remaining capacity based on the voltage. Therefore, current integration eventually becomes necessary to correctly determine the remaining capacity of the electrochemical device.

Meanwhile, if an electrochemical device is fully charged (until the remaining capacity becomes 100%) and the integrated current value is reset to 100%, this reset eliminates integration errors. Performing this operation periodically makes it possible to monitor the remaining capacity with relatively good accuracy.

In the case of the system of FIG. 1, when the electrochemical device is in a fully charged state or a fully discharged state, if the system controller 150 is caused to recognize the remaining capacity of the electrochemical device as 100% or 0%, the remaining capacity can be reset. With the remaining capacity after reset being stored, by starting integration of charge/discharge current of the electrochemical device, the measurement accuracy of the remaining capacity can be heightened.

It should be noted, however, that the amount of power consumed by the load device (energy demand) may vary constantly and is unpredictable. The operation of the load device may abruptly stop. In this case, if the electrochemical device is fully charged to make the remaining capacity to 100%, the electrochemical device is unable to absorb power generated by the power generator, so that the energy is lost. Such energy loss is particularly significant in a system including a power generator, such as a fuel cell, which needs considerable time to stop. Conversely, when the electrochemical device is fully discharged until the remaining capacity becomes 0% in order to reset the integrated current value, it is unable to cope with a rapid increase in the amount of power consumed by the load device. Also, if the system is stopped with the remaining capacity being 0%, the system may be unable to be started the next time.

For example, in the case of electric vehicles and hybrid vehicles, a full charge of the electrochemical device is avoided such that the electrochemical device can collect regenerative energy produced when the vehicle is decelerated. Also, a full discharge of the electrochemical device is avoided such that the electrochemical device can make up for a shortage of energy needed upon acceleration. In this way, the system continues to operate based on current integrals, voltage values and the like, without being able to make the remaining capacity to 100% or 0% to reset the remaining capacity.

Patent Document 1: Japanese Laid-Open Patent Publication No. Hei 1-211860 (FIG. 1 and FIG. 3)

DISCLOSURE OF INVENTION

Problem that the Invention is to Solve

It has been examined to apply the above-described conventional system to charge/discharge management standard for electrochemical devices for use in portable electronic appliances (e.g., smart batteries used in notebook personal computers) and charge/discharge control of electrochemical devices for use in electric vehicles.

However, such conventional systems require complicated operations to accurately monitor the remaining capacity of electrochemical devices. First, it is necessary not only to detect voltage values but also to detect current values and perform integration thereof with respect to time. Second, it is necessary to detect various parameters with high speed to correct integration errors. Third, due to the need to respond to rapid load variations, it is necessary to set a sample rate at which current is detected to a high level. Thus, the circuit becomes complicated and costly. Also, during the operation of the system, it is necessary to constantly perform current integration, and, accordingly, the amount of power consumption increases.

Further, in conventional systems, reset of integrated current cannot be carried out over an extended period of time, so that integration errors gradually increase. Hence, even if one believes that the remaining capacity is maintained in a certain range, it may be actually approaching a fully charged state or a fully discharged state. Thus, the reliability, maintainability and safety of the system may be impaired. To improve such situation, complicated circuit structure is necessary, thereby resulting in high costs. Also, as the number of necessary components increases, the possibility of failure also increases.

In view of the above, the present invention is directed to a power system including an electrochemical device, a load device, and a power generator, and mainly intends to monitor the remaining capacity of the electrochemical device in a relatively easy manner while simplifying the control for maintaining the remaining capacity of the electrochemical device constantly in a certain range.

Means for Solving the Problem

The present invention relates to a power system including: an electrochemical device; a load device; a power generator; and a charge/discharge controller of the electrochemical device. The electrochemical device includes a positive electrode, a negative electrode, and a liquid electrolyte or a solid electrolyte. The charge/discharge curve of the electrochemical device has at least one step, and a given step of the at least one step has an inflection point. A voltage corresponding to the inflection point or a point adjacent to the inflection point is set as a threshold value. The charge/discharge controller is configured to control charge/discharge of the electrochemical device such that the voltage of the electrochemical device approaches the threshold value.

In one mode of the present invention, the power system has a comparator that compares the voltage of the electrochemical device with the threshold value. In this case, based on an output of the comparator, the charge/discharge controller causes the electrochemical device to be charged when the voltage is lower than the threshold value and causes the electrochemical device to be discharged when the measured voltage is higher than the threshold value.

In another mode of the present invention, the power system has a comparator that compares the voltage of the electrochemical device with the threshold value and a remaining capacity detector that calculates a remaining capacity of the electrochemical device based on an output of the comparator. In this case, based on an output of the remaining capacity detector, the charge/discharge controller causes the electrochemical device to be charged when the remaining capacity is less than the remaining capacity corresponding to the threshold value and causes the electrochemical device to be discharged when the remaining capacity is greater than the remaining capacity corresponding to the threshold value. When the remaining capacity is equal to the remaining capacity corresponding to the threshold value, for example, charge or discharge may be arbitrarily selected, or neither charge nor discharge may be performed.

The charge/discharge curve of the electrochemical device varies depending on the charge/discharge conditions of the electrochemical device, for example current value, temperature, and internal impedance. It is thus desirable to correct the remaining capacity according to the charge/discharge conditions of the electrochemical device. That is, the power system of the present invention preferably has: a parameter detector that detects at least one parameter selected from the group consisting of charge/discharge current, temperature and internal impedance of the electrochemical device; and a field adjustor that adjusts the relation between the voltage of the electrochemical device and the threshold value or the relation between the remaining capacity of the electrochemical device and the threshold value based on the detected parameter.

The power system of the present invention preferably has a function of resetting the remaining capacity of the electrochemical device to a predetermined value corresponding to the threshold value when it determines the voltage of the electrochemical device to be equal to the threshold value. Alternatively, the power system of the present invention preferably has: a step detector that detects, based on the voltage of the electrochemical device, that the electrochemical device has a remaining capacity close to that corresponding to the step; and a current integrator that performs current integration near the step, and it preferably has a function of resetting the remaining capacity of the electrochemical device to a predetermined value corresponding to the threshold value when it determines the rate of voltage change relative to capacity change: $\Delta C$ obtained by current integration: $\Delta V/\Delta C$ to be equal to $\Delta V/\Delta C$ at the threshold value that has been predetermined depending on charge/discharge current.

The electrochemical device gradually deteriorates with repetitive charge/discharge. Also, due to the deterioration of the electrochemical device, the charge/discharge curve shrinks, so that the scale of the step also shrinks. Hence, the power system of the present invention preferably has a corrector that corrects the remaining capacity of the electrochemical device based on the scale of the step that is determined from a current integral near the step.

In the power system of the present invention, the threshold value of voltage is preferably set to a voltage range in which the remaining capacity of the electrochemical device is 80 to 90% of a nominal capacity.

When the maximum discharge capacity is defined as 1, the absolute value of the rate of change of voltage (V) relative to capacity: $\Delta V/\Delta C$ preferably has a maximum value of 1 to 10 in the step for which the threshold value is set.

The charge/discharge controller desirably controls charge/discharge of the electrochemical device such that at least a part of a difference between an amount of power generated by the power generator and an amount of power consumed by the load device is supplied or stored. Specifically, when the charge/discharge controller has a power difference determining unit that determines a difference between an amount of power generated by the power generator per unit time and an amount of power consumed by the load device per unit time, the charge/discharge controller controls charge/discharge of the electrochemical device while controlling the amount of power generated by the power generator per unit time based on an output of the power difference determining unit.

The electrochemical device may be charged by utilizing regenerative energy from the load device.

In order to obtain a charge/discharge curve having at least one step, at least one selected from the positive electrode and the negative electrode desirably contains a compound having a structure represented by the general formula (1):

[Chemical formula 1]

where each of $R^1$ and $R^2$ is independently a chain or cyclic aliphatic group, $R^1$ and $R^2$ may be the same or different, each of $X^1$ to $X^4$ is independently a sulfur atom, an oxygen atom or a tellurium atom, $X^1$ to $X^4$ may be the same or different, and the aliphatic group may contain one or more selected from the group consisting of an oxygen atom, a nitrogen atom, a sulfur atom, a silicon atom, a phosphorus atom and a boron atom.

The present invention also pertains to a method for managing a power system that includes an electrochemical device, a load device, and a power generator. The electrochemical device includes a positive electrode, a negative electrode, and a liquid electrolyte or a solid electrolyte. The charge/discharge curve of the electrochemical device has at least one step, and a given step of the at least one step has an inflection point. A voltage corresponding to the inflection point or a point adjacent to the inflection point is set as a threshold value. This method has the step of controlling charge/discharge of the electrochemical device such that the voltage of the electrochemical device approaches the threshold value.

As the charge/discharge controlling step, first, the present invention proposes the steps of: measuring a voltage of the electrochemical device; comparing the measured voltage with the threshold value; and charging the electrochemical device when the measured voltage is lower than the threshold value and discharging the electrochemical device when the measured voltage is higher than the threshold value. When the voltage is equal to the threshold value, for example, charge or discharge may be arbitrarily selected, or neither charge nor discharge may be performed.

As the charge/discharge controlling step, second, the present invention proposes the steps of: measuring a voltage of the electrochemical device; comparing the measured voltage with the threshold value; calculating a remaining capacity of the electrochemical device based on the compared result; and charging the electrochemical device when the remaining capacity is less than the remaining capacity corresponding to the threshold value and discharging the electrochemical device when the remaining capacity is greater than the remaining capacity corresponding to the threshold value. When the voltage is equal to the threshold value, for example, charge or discharge may be arbitrarily selected, or neither charge nor discharge may be performed.

Preferably, the management method of the present invention also has: the step of resetting the remaining capacity of the electrochemical device to a predetermined value corresponding to the threshold value when the voltage of the electrochemical device is determined to be equal to the threshold value; or the step of performing current integration near the threshold value and resetting the remaining capacity of the electrochemical device to a predetermined value corresponding to the threshold value when the rate of voltage change relative to capacity change: $\Delta C$ obtained by the current integration: $\Delta V/\Delta C$ is determined to be equal to $\Delta V/\Delta C$ at the threshold value that has been predetermined depending on charge/discharge current.

Effects of the Invention

According to the present invention, in a power system including an electrochemical device, a load device, and a power generator, the remaining capacity of the electrochemical device can be monitored in a relatively easy manner and, further, control can be easily exercised to maintain the remaining capacity of the electrochemical device constantly in a certain range. That is, the structure of the power system can be simplified compared with conventional structure. Also, according to the present invention, it is possible to provide a system that is improved in reliability, maintainability and safety without shortening the life of the electrochemical device.

When the charge/discharge curve of the electrochemical device has at least one step, the voltage of the electrochemical device changes significantly near the step. It is thus easy to determine whether the voltage is larger or smaller than a threshold value that is set at the inflection point of the step or its adjacent point. Also, at the inflection point of the step or its adjacent point, there are small variations in the remaining capacity of the electrochemical device. Thus, by determining the remaining capacity corresponding to the threshold value in advance and using the determined remaining capacity as reference, the remaining capacity can be calculated almost accurately. Also, by controlling charge/discharge such that the voltage approaches the threshold value, the remaining capacity can be maintained in a certain range almost accurately. As a result, making various corrections is not essential for determining the remaining capacity. Also, performing current integration is not essential either.

Further, in the case of correcting the remaining capacity, correction can be made with a higher accuracy than conventional one. When the voltage of the electrochemical device or the rate of voltage change ($\Delta V/\Delta C$) becomes equal to the threshold value or $\Delta V/\Delta C$ at the threshold value, the remaining capacity of the electrochemical device is reset to a predetermined value, and this makes it possible to eliminate errors such as integration errors. Also, $\Delta C$ can be obtained simply by performing current integration near the step, and there is no need to continuously perform current integration.

If integration errors are eliminated, it is also possible to omit precautions against overcharge and overdischarge resulting from integration errors. That is, there is no need to provide an additional circuit. Hence, it is possible to construct a system with a simple structure but having excellent reliability, maintainability and stability.

BEST MODE FOR CARRYING OUT THE INVENTION

Embodiment 1

The present invention relates to a power system including a power generator, an electrochemical device, a load device, and a charge/discharge controller and to a management method thereof.

The present invention is particularly effective when using a power generator, such as a fuel cell, which cannot readily and quickly increase or decrease the amount of power generation in response to variations in power demand by the load device. This is because, according to the present invention, the difference between the amount of power generated by the power generator and the amount of power consumed by the load device can be offset by charge/discharge of the electrochemical device. It should be noted, however, that the power generator is not particularly limited. Other preferable power generators include solar batteries and generators driven by vehicle engine.

The electrochemical device is not particularly limited and any device capable of electrical charge/discharge may be used. Such examples include lithium ion secondary batteries, alkaline storage batteries, and lead-acid batteries.

The load device is not particularly limited, but the present invention is particularly effective when using a load device, such as a small-sized portable appliance or an electric vehicle, whose power consumption varies significantly during operation.

The charge/discharge curve of the electrochemical device used in the present invention has at least one step.

The presence or absence of a step can also be ascertained from the charge/discharge curve. In the case of 1 C rate charge/discharge, the rate of voltage change in the step is preferably 300 mV or more per capacity change of 10% of the nominal capacity. Also, in the case of 0.1 C rate charge/discharge, the rate of voltage change in the step is preferably 200 mV or more per capacity change of 10% of the nominal capacity. For example, when the electrochemical device is a battery with a nominal capacity of 2000 mAh, during the period in which the battery is discharged at a 1 C rate and the capacity of the battery changes by 10% (200 mAh), the battery voltage desirably changes by 300 mV or more. Also, during the period in which the battery is discharged at a 0.1 C rate and the capacity of the battery changes by 10%, the battery voltage desirably changes by 200 mV or more.

Also, when the maximum discharge capacity of the electrochemical device is defined as 1, the absolute value of the rate of change of voltage (V) relative to capacity: $\Delta V/\Delta C$ preferably has a maximum value of 1 to 10, or further, 1 to 7 in the step for which a threshold value is set.

The charge/discharge controller controls charge/discharge of the electrochemical device such that the voltage of the electrochemical device approaches a predetermined threshold value. The threshold value of voltage is set at the inflection point or its adjacent point of a given step of the charge/discharge curve of the electrochemical device. The configuration of the charge/discharge controller is not particularly limited and various electronic circuits and the like may be used.

According to one mode of the present invention, the power system has a comparator that compares the voltage of the electrochemical device with the threshold value. The comparator periodically measures the voltage of the electrochemical device and compares the measured voltage with the threshold value. The comparator first measures the voltage of the electrochemical device. The measured voltage is then compared with the threshold value stored in a predetermined memory means. Upon comparison, if the voltage is lower than the threshold value, the electrochemical device is charged according to the instruction of the charge/discharge controller. As a result, the voltage of the electrochemical device rises toward the threshold value. On the other hand, if the voltage is higher than the threshold value, the electrochemical device is discharged according to the instruction of the charge/discharge controller. As a result, the voltage of the electrochemical device lowers toward the threshold value. If the voltage is equal to the threshold value, charge or discharge is arbitrarily selected according to the instruction of the charge/discharge controller. It is preferred to select charge when the electrochemical device is being charged upon the output of the comparison result and to select discharge when the electrochemical device is being discharged upon the output of the comparison result.

According to another mode of the present invention, the power system has a comparator that compares the voltage of the electrochemical device with the threshold value, and a remaining capacity detector that calculates the remaining capacity of the electrochemical device based on the output of the comparator. The comparator first measures the voltage of the electrochemical device. The measured voltage is compared with the threshold value stored in a predetermined memory means. The output of the comparator is transmitted to the remaining capacity detector.

When the voltage is higher than the threshold value, the remaining capacity of the electrochemical device is higher than the remaining capacity corresponding to the threshold value in terms of probability. On the other hand, when the voltage is lower than the threshold value, the remaining capacity of the electrochemical device is less than the remaining capacity corresponding to the threshold value in terms of probability. Therefore, by using the remaining capacity corresponding to the threshold value as reference, the remaining capacity detector can calculate the remaining capacity almost accurately. The relation among the voltage, the threshold value, and the remaining capacity, for example, is stored in a predetermined memory means. If the remaining capacity is less than the remaining capacity corresponding to the threshold value, the electrochemical device is charged according to the instruction of the charge/discharge controller. If the remaining capacity is greater than the remaining capacity corresponding to the threshold value, the electrochemical device is discharged according to the instruction of the charge/discharge controller. If the remaining capacity is equal to the remaining capacity corresponding to the threshold value, charge or discharge is arbitrarily selected in the same manner as in the above.

For setting the threshold value, a system user may determine a threshold value in advance and the determined threshold value may be stored in a predetermined memory means, for example, part of the hardware of the comparator. Alternatively, the comparator may have a function of automatically setting a threshold value. In this case, the comparator may have a function of, for example, monitoring the voltage of the electrochemical device during charge or discharge, detecting the inflection point at which the absolute value of the rate of voltage change: $\Delta V/\Delta C$ becomes relatively high, and setting a threshold value relative to the inflection point.

The threshold value may be set at the inflection point or may be set at a point adjacent to the inflection point (a point having a voltage difference of $\Delta Vx$ from the inflection point). However, the threshold value is preferably in the voltage range in which the remaining capacity of the electrochemical device is 80 to 90% of the nominal capacity. This is because the electrochemical device desirably has a margin (rechargeable capacity) while maintaining sufficient output voltage and capacity. When the voltage difference $\Delta Vx$ is commensurate with the capacity change $\Delta C$ of the electrochemical device, AC preferably corresponds to 10% or less of the nominal capacity. If $\Delta C$ is too large, there is a large alienation between the inflection point and the threshold value, so that the determination of the remaining capacity will gradually involve errors.

According to the above-described control, the charge/discharge of the electrochemical device is controlled such that the voltage of the electrochemical device approaches the threshold value. Also, when the threshold value is set in the voltage range in which the remaining capacity of the electrochemical device is 80 to 90% of the nominal capacity, the remaining capacity of the electrochemical device will approach 80 to 90% of the nominal capacity.

Figure 3:
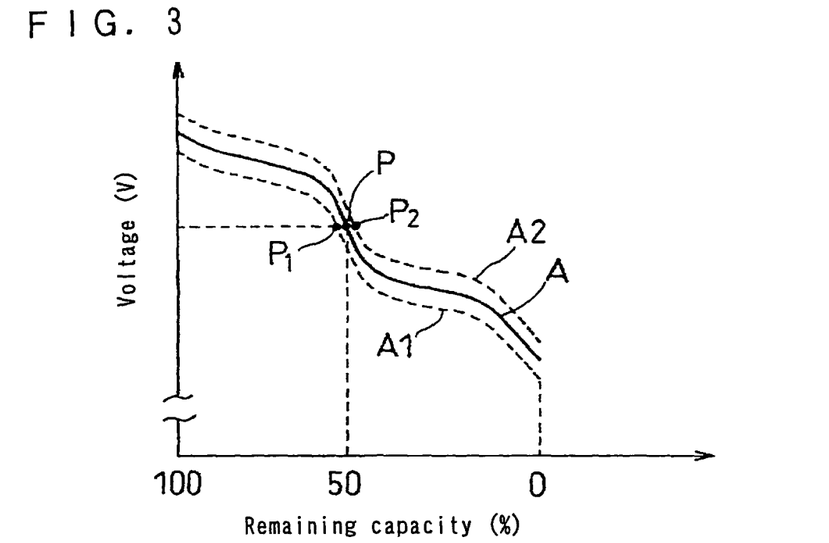
FIG. 3 shows an exemplary charge/discharge curve of an electrochemical device included in a power system of the present invention.

FIG. 3 is an exemplary charge/discharge curve of an electrochemical device used in a power system of the present invention. The ordinate represents the voltage of the electrochemical device, while the abscissa represents the remaining capacity (or charge/discharge time) of the electrochemical device.

Figure 4:
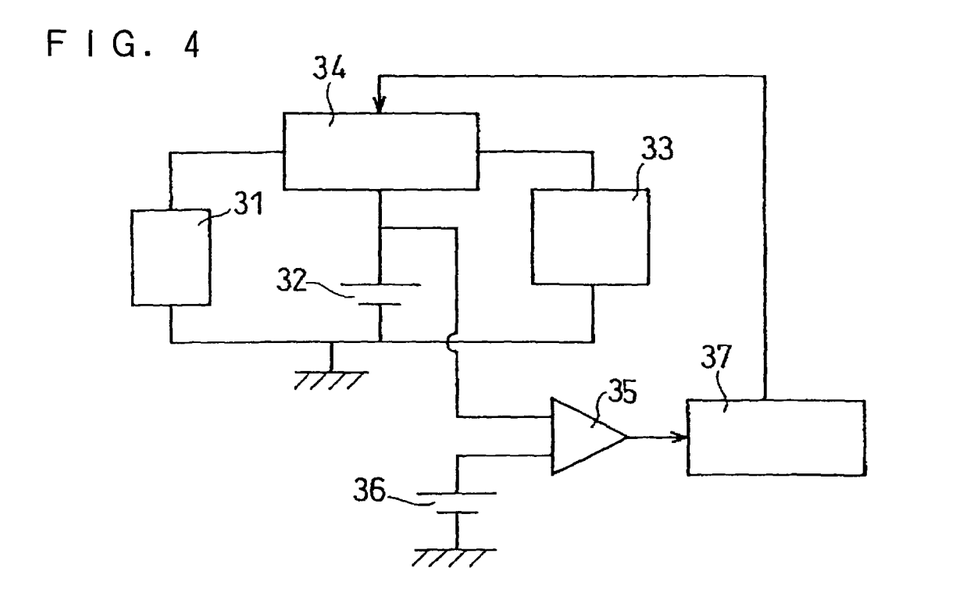
FIG. 4 is a block diagram of a power system according to Embodiment 1 of the present invention.

FIG. 4 is a block diagram of an exemplary power system of the present invention. This power system has a power generator 31, an electrochemical device 32, and a load device 33, and the charge/discharge of the electrochemical device 32 is controlled by a charge/discharge controller 34.

A charge/discharge curve A has one step, with an inflection point P at the substantially central part of the step. Also, at the inflection point P, the remaining capacity is 50%. However, the charge/discharge curve is not limited to such shape and may have a plurality of steps. This is because the shape of the charge/discharge curve varies according to the kind of the electrochemical device, and focusing on any one of the plurality of steps can produce the effects of the present invention.

The charge/discharge curve of the electrochemical device may vary according to the operating environment of the electrochemical device and the current value. In FIG. 3, the charge/discharge curve A is an average charge/discharge curve. A curve A1 and a curve A2 represent the lower and upper limits of the range of variation, respectively. Near the step, the curve A1 and the curve A2 pass through a point $P_1$ and a point $P_2$, which have the same voltage as the inflection point P of the charge/discharge curve A. It can be judged that the remaining capacities corresponding to the point $P_1$ and the point $P_2$ are substantially 50%.

When the electrochemical device has a charge/discharge curve as illustrated in FIG. 3 and the voltage at the point P is set as the threshold value, a comparator 35 in FIG. 4 monitors the voltage of an electrochemical device 32 and compares the monitored voltage with the voltage at the point P. The voltage at the point P is applied to the comparator 35 by a reference power source 36 as the threshold value. The voltage of the electrochemical device may be converted by an AD converter, and the resultant digital data may be used in a subsequent process or may be converted to analog data midway through the process.

Next, based on the output of the comparator 35, a remaining capacity detector 37 calculates whether the remaining capacity is 50% or more, or less than 50%. Based on the output of the remaining capacity detector 37, the charge/discharge controller 34 switches between charge and discharge of the electrochemical device 32 to make the remaining capacity of the electrochemical device 32 approach 50%.

The above description with reference to FIGS. 3 to 4 has been made of the case where the inflection point of the charge/discharge curve corresponds to a remaining capacity of 50%; however, the rechargeable capacity of the electrochemical device is sufficient if the energy produced when the power generator is stopped can be absorbed. In actuality, the inflection point of the charge/discharge curve desirably corresponds to a remaining capacity of 80 to 90% in terms of improving the energy supply capability of the system. However, when the system is applied to an electric vehicle such as an electric car, the electrochemical device needs to have a margin large enough to absorb regenerative energy from the load device. The threshold value for managing the remaining capacity varies according to the kind of the electrochemical device, connecting ways of respective components, etc.

To heighten the energy efficiency of the system, it is preferred to control the charge/discharge of the electrochemical device such that the electrochemical device supplies or stores at least a part of the difference between the amount of power generated by the power generator and the amount of power consumed by the load device.

For this purpose, it is effective that the charge/discharge controller has a power difference determining unit that determines the difference between the amount of power generated by the power generator per unit time and the amount of power consumed by the load device per unit time, and that based on the output of the power difference determining unit, the charge/discharge controller controls the charge/discharge of the electrochemical device while controlling the amount of power generated by the power generator per unit time.

The electrochemical device is controlled by the charge/discharge controller such that it always has a rechargeable capacity. Thus, when the amount of power generated by the power generator per unit time exceeds the amount of power consumed by the load device per unit time, extra power can be charged into the electrochemical device. If the remaining capacity of the electrochemical device becomes high, the charge/discharge controller issues an instruction to discharge the electrochemical device. The instruction is sent to, for example, a power generation controller that controls the amount of power generated by the power generator per unit time.

On the other hand, when the amount of power generated by the power generator per unit time is less than the amount of power consumed by the load device per unit time, the shortage of power can be made up for by the discharge of the electrochemical device. If the remaining capacity of the electrochemical device becomes small, the charge/discharge controller issues an instruction to charge the electrochemical device, and the instruction is sent to the power generation controller. Also, instead of increasing the amount of power generated by the power generator per unit time, it is also possible to store regenerative energy from the load device in the electrochemical device.

The correlation between the inflection point of the electrochemical device and the remaining capacity can be set freely by varying the design of the electrochemical device. For example, by using materials represented by the general formula:

[Chemical formula 2]

singly or in combination of two or more of them as active material of the positive electrode and/or negative electrode of the electrochemical device, it is possible to provide the charge/discharge curve with a desired step.

In the above formula, each of $R^1$ and $R^2$ is independently a chain or cyclic aliphatic group, $R^1$ and $R^2$ may be the same or different, each of $X^1$ to $X^4$ is independently a sulfur atom, an oxygen atom or a tellurium atom, $X^1$ to $X^4$ may be the same or different, and the aliphatic group may contain one or more selected from the group consisting of an oxygen atom, a nitrogen atom, a sulfur atom, a silicon atom, a phosphorus atom, a boron atom and a halogen atom.

The position and number of the step(s) in the charge/discharge curve can be controlled, for example, by changing $R^1$, $R^2$, and $X^1$ to $X^4$. Specific examples of compounds represented by the above-mentioned general formula include the following.

[Chemical formula 3]

In the above formula, each of $R^1$ to $R^4$ is independently a chain or cyclic aliphatic group, a hydrogen atom, a hydroxyl group, a cyano group, an amino group, a nitro group or a nitroso group, $R^1$ to $R^4$ may be the same or different, and the aliphatic group may contain one or more selected from the group consisting of an oxygen atom, a nitrogen atom, a sulfur atom, a silicon atom, a phosphorus atom, a boron atom and a halogen atom.

[Chemical formula 4]

In the above formula, each of $R^1$ and $R^2$ is independently a chain or cyclic aliphatic group, a hydrogen atom, a hydroxyl group, a cyano group, an amino group, a nitro group or a nitroso group, $R^1$ and $R^2$ may be the same or different, X is a sulfur atom, an oxygen atom or a tellurium atom, and the aliphatic group may contain one or more selected from the group consisting of an oxygen atom, a nitrogen atom, a sulfur atom, a silicon atom, a phosphorus atom, a boron atom and a halogen atom.

[Chemical formula 5]

In the above formula, each of X and Y is independently a sulfur atom, an oxygen atom or a methylene group, and X and Y may be the same or different.

[Chemical formula 6]

In the above formula, each of $R^1$ and $R^2$ is independently a chain or cyclic aliphatic group, a hydrogen atom, a hydroxyl group, a cyano group, an amino group, a nitro group or a nitroso group, $R^1$ and $R^2$ may be the same or different, the aliphatic group may contain one or more selected from the group consisting of an oxygen atom, a nitrogen atom, a sulfur atom, a silicon atom, a phosphorus atom, a boron atom and a halogen atom, and n is equal to or greater than 1.

[Chemical formula 7]

Embodiment 2

This embodiment describes a power system equipped with a parameter detector that detects a parameter other than the voltage of an electrochemical device, and a field adjustor that adjusts, based on the detected parameter, the relation between the voltage of the electrochemical device and the threshold value or the relation between the remaining capacity of the electrochemical device and the threshold value. This embodiment also describes a management method thereof.

As shown in FIG. 3, the charge/discharge curve changes depending on the charge/discharge condition of the electrochemical device. Thus, it is preferred to adjust the relation between the voltage of the electrochemical device and the threshold value or the relation between the remaining capacity of the electrochemical device and the threshold value depending on the charge/discharge condition of the electrochemical device. Such adjustment can be made by utilizing a parameter other than the voltage of the electrochemical device.

Examples of parameters other than the voltage of the electrochemical device include charge/discharge current, temperature, and internal impedance. It is desirable to obtain a function or a map that relates such a parameter with the remaining capacity of the electrochemical device, the voltage thereof, and the threshold value in advance and store it in a field adjustor.

Figure 5:
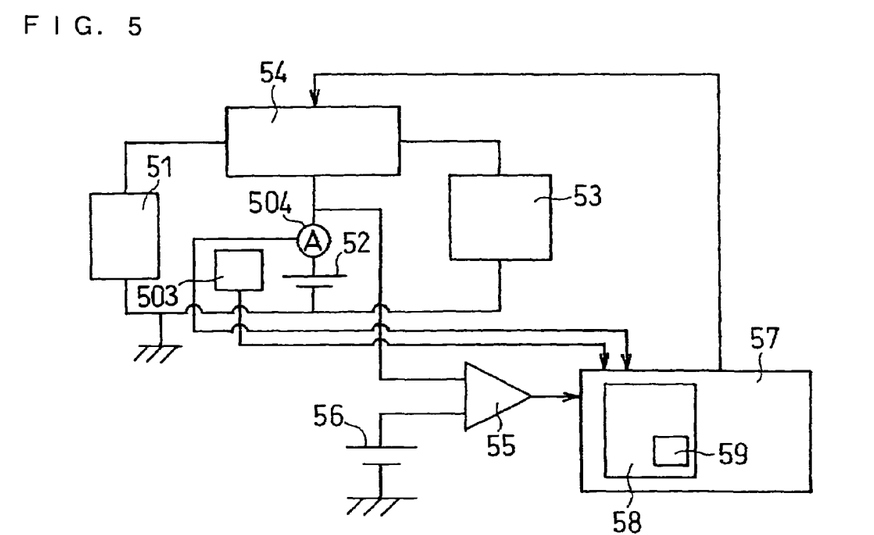
FIG. 5 is a block diagram of a power system according to Embodiment 2 of the present invention.

FIG. 5 is a block diagram of an exemplary power system equipped with a parameter detector that detects a parameter other than voltage and a field adjustor that adjusts, based on the detected parameter, the relation between the remaining capacity of the electrochemical device and the threshold value. This power system has the same configuration as that of the power system of Embodiment 1 except that it has the parameter detector and the field adjustor. Specifically, this power system includes a power generator 51, an electrochemical device 52, and a load device 53, and the charge/discharge of the electrochemical device 52 is controlled by a charge/discharge controller 54. A comparator 55 monitors the voltage of the electrochemical device 52 and compares the voltage with the threshold value. The threshold value is applied to the comparator 55 by a reference power source 56.

A field adjustor comprises a correction standard calculator 58 and a correction value calculator 59. Also, the correction standard calculator 58 is in communication with parameter detectors, i.e., a temperature detector 503 and a current meter 504. Specifically, the electrochemical device 52 is fitted with the temperature detector 503 such as a thermocouple, and further, the current meter 504 is connected to the electrochemical device 52 in series. Each of the temperature detector 503 and the current meter 504 is in communication with the correction standard calculator 58, which is included in a remaining capacity detector 57. The correction standard calculator 58 stores a function that relates the parameters with the remaining capacity of the electrochemical device. The correction standard calculator 58 calculates correction standard by substituting the detected parameters into the above-mentioned function. The resultant correction standard is sent to the correction value calculator 59.

Based on the output of the comparator 55, the remaining capacity detector 57 outputs the remaining capacity of the electrochemical device. The output is sent to the correction value calculator 59. The correction value calculator 59 corrects the output of the remaining capacity by using the correction standard. Based on the corrected remaining capacity, the charge/discharge controller 54 switches between charge and discharge of the electrochemical device 52 to make the remaining capacity approach the predetermined value.

Embodiment 3

This embodiment describes a power system having a function of resetting the remaining capacity of an electrochemical device to a predetermined value corresponding to a threshold value when the voltage of the electrochemical device is determined to be equal to the threshold value or when the rate of voltage change relative to the capacity of the electrochemical device: $\Delta V/\Delta C$ is determined to be equal to $\Delta V/\Delta C$ at the threshold value that has been predetermined depending on charge/discharge current. This embodiment also describes a management method thereof.

As shown in FIG. 3, near the threshold value, the remaining capacity of the electrochemical device does not change significantly. Also, the remaining capacity at the threshold value can be determined in advance. Usually, there is an error between the remaining capacity of the electrochemical device determined by the power system and the actual remaining capacity, and this error increases with time. In this case, the error can be eliminated or reduced by resetting the remaining capacity of the electrochemical device to a predetermined value corresponding to the threshold value when the voltage of the electrochemical device is determined to be equal to the threshold value.

FIG. 3 shows that although the voltage values at the inflection points of curves A, A1 and A2 are different, the rates of voltage change at these inflection points are almost the same. This indicates that even if the operation environment or operation frequency of the electrochemical device is changed, the actually measured rate of voltage change is unlikely to change. Therefore, the remaining capacity of the electrochemical device may be reset to a predetermined value when the actually measured $\Delta V/\Delta C$ is determined to be equal to the $\Delta V/\Delta C$ at the threshold value, rather than when the voltage of the electrochemical device is determined to be equal to the threshold value. When the $\Delta V/\Delta C$ at the threshold value changes depending on the charge/discharge current, the relation between the charge/discharge current and the $\Delta V/\Delta C$ at the threshold value is determined in advance and stored in a predetermined memory means. Using the necessary relation, determination is made depending on the charge/discharge current.

Current integration for obtaining $\Delta C$ may be performed only near the step. It can be judged from the voltage of the electrochemical device that the electrochemical device has a remaining capacity close to that corresponding to the step. It is thus preferred that the remaining capacity detector have a step detector for detecting that the electrochemical device has a remaining capacity close to that corresponding to the step, and that current integration be started based on the signal from the step detector. When the $\Delta V/\Delta C$ obtained from the current integration is determined to be equal to the $\Delta V/\Delta C$ at the threshold value that has been predetermined depending on the charge/discharge current, the remaining capacity of the electrochemical device is reset to a predetermined value corresponding to the threshold value.

Figure 6:
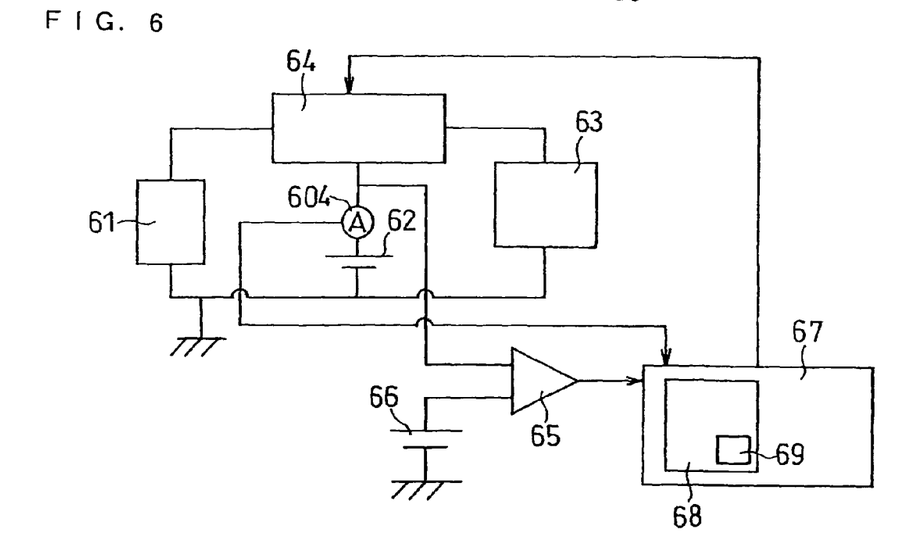
FIG. 6 is a block diagram of a power system according to Embodiment 3 of the present invention.

FIG. 6 is a block diagram of an exemplary power system in which the remaining capacity detector resets the remaining capacity based on current integration. This power system has the same configuration as that of the power system of Embodiment 2, except that the remaining capacity detector has a step detector for detecting that the remaining capacity of the electrochemical device is close to that corresponding to the step and a current integrator, instead of the correction standard calculator and the correction value calculator. Specifically, this power system includes a power generator 61, an electrochemical device 62 and a load device 63, and the charge/discharge of the electrochemical device 62 is controlled by a charge/discharge controller 64. A comparator 65 monitors the voltage of the electrochemical device 62 and compares the voltage with a threshold value. The threshold value is applied to the comparator 65 by a reference power source 66.

The electrochemical device 62 is connected to a current meter 604 in series. The current meter 604 is in communication with a current integrator 68, which is included in a remaining capacity detector 67. When a step detector 69 detects from the voltage of the electrochemical device that the remaining capacity is close to that corresponding to the step, the current integrator 68 starts integration of current detected by the current meter 604.

The remaining capacity detector 67 has a function of starting current integration when it detects, based on the output of the comparator 65, that the remaining capacity of the electrochemical device is close to that corresponding to the step, and of resetting the remaining capacity of the electrochemical device to a predetermined value when it detects that the rate of voltage change relative to the capacity of the electrochemical device: $\Delta V/\Delta C$ is equal to the $\Delta V/\Delta C$ at the threshold value that has been predetermined depending on the charge/discharge current. Based on the remaining capacity after reset, the charge/discharge controller 64 switches between charge and discharge of the electrochemical device 62 to make the remaining capacity approach the predetermined value.

It should be noted that when the electrochemical device deteriorates, the charge/discharge curve shrinks while maintaining the shape of the curve. This property may be utilized to correct the remaining capacity. For example, the scale of the step decreases as the charge/discharge curve shrinks. Hence, when current integration is performed near the step, for example, the scale of the step can be determined from the spacing between two given $\Delta V/\Delta C$ values sandwiching the inflection point, and based on the obtained scale of the step, the remaining capacity can be corrected.

The systems according to Embodiments 2 and 3 have a slightly complicated circuit structure, but they permit reliable measurement of the remaining capacity. Thus, they can prevent the electrochemical device from being fully charged or fully discharged, so that the system reliability is heightened.

In Embodiment 2, the correction standard calculator may have a capability of correcting a predetermined function when it determines that the voltage of the electrochemical device is equal to the threshold value, or when it determines that the rate of voltage change relative to the capacity of the electrochemical device: $\Delta V/\Delta C$ is equal to the $\Delta V/\Delta C$ at the threshold value that has been predetermined depending on the charge/discharge current.

INDUSTRIAL APPLICABILITY

The present invention is useful in power systems having a power generator, such as a fuel cell, and is applicable to uses including electric vehicles, such as electric cars and hybrid cars, and portable electronic appliances, such as notebook personal computers.

The invention claimed is:

1. A power system comprising: an electrochemical device; a load device; a power generator; and a charge/discharge controller of said electrochemical device,
said electrochemical device comprising a positive electrode, a negative electrode, and a liquid electrolyte or a solid electrolyte,
said electrochemical device having a charge/discharge curve that has at least one step, a given step of said at least one step having an inflection point, a voltage corresponding to the inflection point or a point adjacent to the inflection point being set as a threshold value, the inflection point existing greater than 0% and less than 100% of a remaining capacity,
said charge/discharge controller being configured to control charge/discharge of said electrochemical device, and said power system further comprises a comparator that compares the voltage of said electrochemical device with said threshold value, wherein based on an output of said comparator, said charge/discharge controller causes said electrochemical device to be charged whenever the voltage is lower than said threshold value and causes said electrochemical device to be discharged whenever the voltage is higher than said threshold value so that the voltage of said electrochemical device approaches said threshold value;
wherein, when the voltage equals to the threshold value, said charge/discharge controller selects charging if the electrochemical device is being charged upon the output of the comparison result, and select discharging if the electrochemical device is being discharged upon the output of the comparison result.

2. The power system in accordance with claim 1, further comprising: a remaining capacity detector that calculates a remaining capacity of said electrochemical device based on the output of said comparator,
wherein based on an output of said remaining capacity detector, said charge/discharge controller charges said electrochemical device when the remaining capacity is less than the remaining capacity corresponding to said threshold value and discharges said electrochemical device when the remaining capacity is greater than the remaining capacity corresponding to said threshold value.

3. The power system in accordance with claim 1, wherein said charge/discharge controller controls charge/discharge of said electrochemical device such that at least a part of a difference between an amount of power generated by said power generator and an amount of power consumed by said load device is supplied or stored.

4. The power system in accordance with claim 3, wherein said charge/discharge controller further comprises a power difference determining unit that determines a difference between an amount of power generated by said power generator per unit time and an amount of power consumed by said load device per unit time, and based on an output of said power difference determining unit, said charge/discharge controller controls charge/discharge of said electrochemical device while controlling the amount of power generated by said power generator per unit time.

5. The power system in accordance with claim 1, wherein said electrochemical device is charged by utilizing regenerative energy from said load device.

6. The power system in accordance with claim 1, wherein at least one selected from said positive electrode and said negative electrode comprises a compound having a structure represented by the general formula (1):

where each of $R^1$ and $R^2$ is independently a chain or cyclic aliphatic group, $R^1$ and $R^2$ may be the same or different, each of $X^1$ to $X^4$ is independently a sulfur atom, an oxygen atom or a tellurium atom, $X^1$ to $X^4$ may be the same or different, and said aliphatic group may contain one or more selected from the group consisting of an oxygen atom, a nitrogen atom, a sulfur atom, a silicon atom, a phosphorus atom and a boron atom.

7. The power system in accordance with claim 1, further comprising:
   a parameter detector that detects at least one parameter selected from the group consisting of charge/discharge current, temperature and internal impedance of said electrochemical device; and
   a field adjustor that adjusts the relation between the voltage of said electrochemical device and said threshold value based on the detected parameter.

8. The power system in accordance with claim 2, further comprising: a parameter detector that detects at least one parameter selected from the group consisting of charge/discharge current, temperature and internal impedance of said electrochemical device; and a field adjustor that adjusts the relation between the voltage or remaining capacity of said electrochemical device and said threshold value based on the detected parameter.

9. The power system in accordance with claim 2, wherein said remaining capacity detector resets the remaining capacity of said electrochemical device to a predetermined value corresponding to said threshold value when it determines the voltage of said electrochemical device to be equal to said threshold value.

10. The power system in accordance with claim 9, wherein said remaining capacity detector comprises: a step detector that detects, based on the voltage of said electrochemical device, that said electrochemical device has a remaining capacity close to a remaining capacity corresponding to said step; a current integrator that performs current integration near said step; and a corrector that corrects the remaining capacity of said electrochemical device based on a scale of the step that is determined from a current integral near said step.

11. The power system in accordance with claim 2,
   wherein said remaining capacity detector comprises: a step detector that detects, based on the voltage of said electrochemical device, that said electrochemical device has a remaining capacity close to that corresponding to said step; and a current integrator that performs current integration near said step, and
   wherein said remaining capacity detector resets the remaining capacity of said electrochemical device to a predetermined value corresponding to said threshold value when it determines the rate of voltage change relative to capacity change: AC obtained by current integration:
   $\Delta V/\Delta C$ to be equal to $\Delta V/\Delta C$ at the threshold value that has been predetermined depending on charge/discharge current.

12. The power system in accordance with claim 11, wherein said remaining capacity detector has a corrector that corrects the remaining capacity of said electrochemical device based on a scale of the step that is determined from a current integral near said step.

13. A method for managing a power system that comprises an electrochemical device, a load device, and a power generator,
   said electrochemical device comprising a positive electrode, a negative electrode, and a liquid electrolyte or a solid electrolyte,
   said electrochemical device having a charge/discharge curve that has at least one step, a given step of said at least one step having an inflection point, a voltage corresponding to the inflection point or a point adjacent to the inflection point being set as a threshold value, the inflection point existing greater than 0% and less than 100% of a remaining capacity, and
   said method comprising controlling charge/discharge of said electrochemical device, wherein said controlling charge/discharge comprises the steps of:
   measuring a voltage of said electrochemical device;
   comparing the measured voltage with said threshold value;
   based on a result of the comparing, charging said electrochemical device whenever the measured voltage is lower than said threshold value and discharging said electrochemical device whenever the measured voltage is higher than said threshold value such that the voltage of said electrochemical device approaches said threshold value, and
   wherein said controlling charge/discharge further comprises the steps of:
   when the measured voltage equals to said threshold value, charging said electrochemical device if the electrochemical device is being charged upon the measuring the voltage, and discharging the electrochemical device if the electrochemical device is being discharged upon the measuring the voltage.

14. The method for managing a power system in accordance with claim 13, wherein said controlling charge/discharge comprises the steps of:
   calculating a remaining capacity of said electrochemical device based on said compared result; and
   charging said electrochemical device when the remaining capacity is less than the remaining capacity corresponding to said threshold value and discharging said electrochemical device when the remaining capacity is greater than the remaining capacity corresponding to said threshold value.

15. The method for managing a power system in accordance with claim 14, further comprising the step of resetting the remaining capacity of said electrochemical device to a predetermined value corresponding to said threshold value when the voltage of said electrochemical device is determined to be equal to said threshold value.

16. The method for managing a power system in accordance with claim 14, further comprising the step of performing current integration near said threshold value and resetting the remaining capacity of said electrochemical device to a predetermined value corresponding to said threshold value when the rate of voltage change relative to capacity change: AC obtained by the current integration: $\Delta V/\Delta C$ is determined to be equal to $\Delta V/\Delta C$ at said threshold value that has been predetermined depending on charge/discharge current.

17. The power system in accordance with claim 1, wherein the threshold value exists in a voltage range corresponding to between 80% and 90% of a remaining capacity.

18. The method for managing a power system in accordance with claim 13, wherein the threshold value exists in a voltage range corresponding to between 80% and 90% of a remaining capacity.

* * * * *